(12) United States Patent
Gundlach et al.

(10) Patent No.: US 7,055,678 B2
(45) Date of Patent: Jun. 6, 2006

(54) MODULAR CONVEYOR BELT WITH NON-CIRCULAR HINGE PIN

(75) Inventors: James O. Gundlach, New Orleans, LA (US); Christopher G. Greve, Covington, LA (US); Robert S. Lapeyre, New Orleans, LA (US)

(73) Assignee: Laitram, L.L.C., Haraham, LA (US)

( * ) Notice: Subject to any disclaimer, the term of this patent is extended or adjusted under 35 U.S.C. 154(b) by 9 days.

(21) Appl. No.: 10/487,793

(22) PCT Filed: Aug. 21, 2002

(86) PCT No.: PCT/US02/26539

§ 371 (c)(1),
(2), (4) Date: Feb. 26, 2004

(87) PCT Pub. No.: WO03/020619

PCT Pub. Date: Mar. 13, 2003

(65) Prior Publication Data

US 2004/0200697 A1 Oct. 14, 2004

(51) Int. Cl.
*B65G 17/06* (2006.01)

(52) U.S. Cl. .................... 198/851; 198/850; 198/852

(58) Field of Classification Search ............ 198/844.1, 198/850, 851, 852
See application file for complete search history.

(56) References Cited

U.S. PATENT DOCUMENTS

| | | | | |
|---|---|---|---|---|
| 3,392,819 A | * | 7/1968 | Waite ..................... | 198/852 |
| 4,782,940 A | * | 11/1988 | Hogg ..................... | 198/735.1 |
| 5,125,874 A | * | 6/1992 | Fryer et al. ............. | 474/214 |
| 6,059,097 A | | 5/2000 | Clopton ................. | 198/852 |
| 6,213,292 B1 | * | 4/2001 | Takahashi et al. ...... | 198/853 |
| 6,364,094 B1 | * | 4/2002 | Alstmar ................. | 198/852 |
| 6,387,003 B1 | * | 5/2002 | Horie et al. ............ | 474/215 |
| 6,439,378 B1 | * | 8/2002 | MacLachlan ........... | 198/850 |
| 6,758,328 B1 | * | 7/2004 | Arai et al. .............. | 198/852 |

* cited by examiner

*Primary Examiner*—Khoi H. Tran

(74) *Attorney, Agent, or Firm*—James T. Cronvich

(57) ABSTRACT

A modular conveyor belt forming a hinge between consecutive belt rows (14A–C) hingedly connected by a noncircular hinge pin (34). Hinge eyes (28) along the forward and rearward ends of each row (14A–C) of belt modules include aligned openings for the hinge pins (34). The belt rows (14A–C) are arranged end-to-end with the hinge eyes (28) of adjacent rows interleaved. In one version, the hinge pins (34) are inserted in the passageway formed by the aligned openings of the interleaved hinge eyes. The hinge pins (34) include first (40) and second (41) hinge pin members, such as flat strips. The openings in the hinge eyes (28) are characterized by a narrow slotted portion (32) for restraining the first hinge pin member (40) against rotation within the slotted portion and a wider sector-shaped portion (33) that allows the second hinge pin member (41) to rotate relative to the first hinge pin member (40). In another version, a single non-circular hinge pin having a convex rocker face along one side is received in aligned openings in the interleaved sets of hinge eyes of consecutive rows. The convex rocker faces rock on convex rocker surfaces bounding the second aligned openings as the belt articulates at the hinge formed at the hinge pin.

22 Claims, 6 Drawing Sheets

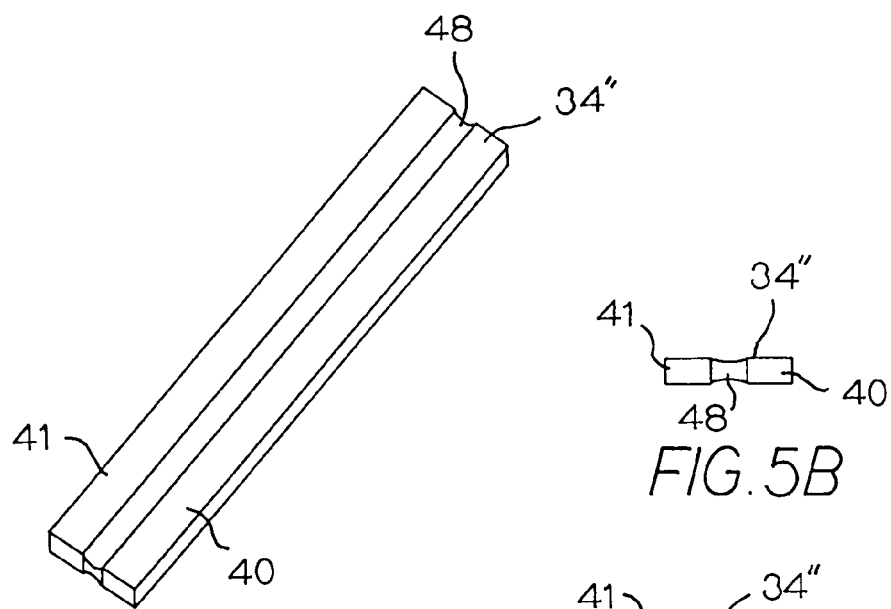
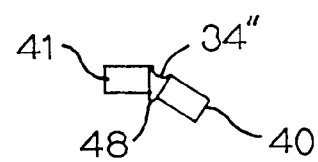
FIG.5A
FIG.5B
FIG.5C
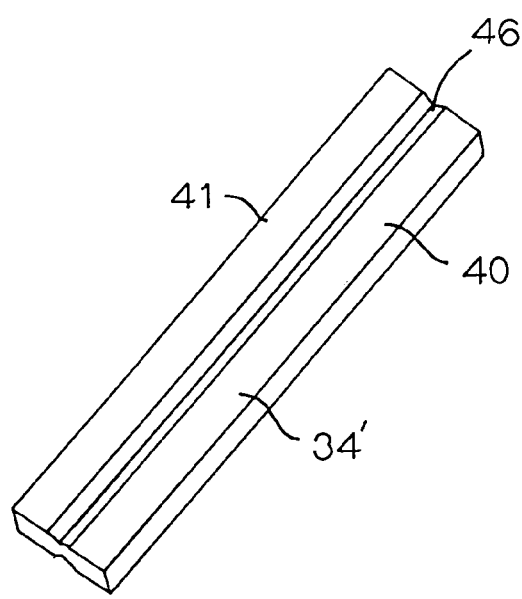
FIG.4A
FIG.4B
FIG.4C

MODULAR CONVEYOR BELT WITH NON-CIRCULAR HINGE PIN

BACKGROUND

The invention relates generally to power-driven modular plastic conveyor belts and, more particularly, to modular plastic conveyor belts hingedly interconnected row to row by non-circular hinge pins.

Conventional modular conveyor belts and chains are constructed of modular links, or belt modules, arranged in rows. Spaced apart hinge eyes extending from each end of the modules include aligned openings. The hinge eyes along one end of a row of modules are interleaved with the hinge eyes of an adjacent row. A pivot rod, or hinge pin, journalled in the aligned openings of interleaved hinge eyes, connects adjacent rows together end to end to form an endless conveyor belt capable of articulating about a drive sprocket or drum.

Because they do not corrode and are easy to clean, modular plastic conveyor belts are often used instead of metal belts. Usually, the hinge pins in plastic belts are also made of plastic. The hinge pins are typically circular in cross section and reside in circular openings in the hinge eyes. Relative motion between the hinge pins and the walls of the hinge eyes as the belt articulates about sprockets tends to wear both the hinge pin and the hinge eye wall. In abrasive environments, such as in conveying potatoes and other agricultural produce, this wear is accelerated by the intrusion of dirt and grit into the hinges of the belt.

Metal hinge pins are sometimes used to increase the wear life of the pins. But that does not do away with the relative motion between pin and hinge eye wall, and belt module wear at the hinge is still a problem.

Non-circular hinge strips made of a flexible material have been proposed to resist wear. Hinge eyes forming slots with flared ends permit the confined hinge strip to flex a limited angle without frictionally rubbing with the hinge eyes as the belt articulates. Such an arrangement is effective in increasing wear life, but the flexible hinge strip is inherently weak in shear strength and unsuitable for carrying heavy loads.

Some power transmission chains constructed of metal components use a pair of pins in each joint between consecutive groups of links. At each joint, one pin is wedged into the openings of one group of links and another pin, in rocking engagement with the first pin, is wedged in the openings of the adjacent group of links. In this way, relative motion is confined to the rocking surfaces of the metal pins. But transmission chains and modular conveyor belts operate in different environments and serve different purposes. Power transmission chains often are used in well-lubricated environments, relatively free of abrasives, as in internal combustion engines and other machinery in which the use of gears is impractical. Modular conveyor belts, on the other hand, are frequently used in very abrasive, non-lubricated environments to move various products over long distances.

Thus, there is a need for a modular plastic conveyor belt that can resist wear at the hinge for a long operating life even in abrasive environments.

SUMMARY

This need and others are satisfied by a modular plastic belt having features of the invention. The belt is formed of a series of rows of belt modules having a conveying surface. Each row includes one or more belt modules extending from a forward end to a rearward end in the direction of belt travel. A first set of hinge eyes is arranged along the forward end, and a second set of hinge eyes is arranged along the rearward end. First aligned openings are formed in the first set of hinge eyes, and second aligned openings are formed in the second set of hinge eyes. The rows are arranged end-to-end with the first set of hinge eyes of a row interleaved with the second set of hinge eyes of an adjacent row. The first and second openings receive non-circular hinge pins that connect the rows together at a hinge between consecutive rows to form a conveyor belt. Each of the hinge pins has a convex rocker face on one side. The second openings are bounded by a convex rocker surface against which the rocker face of the received hinge pin rocks as the belt articulates about the pin at the hinge.

In another version, the rows are hingedly connected together to form a conveyor belt by a plurality of hinge pins, each of which is divided lengthwise into two parts: a first hinge pin member and a second hinge pin member. The first hinge pin member is disposed in the first end of the openings in the first set of hinge eyes of a row and in the second end of the openings in the interleaved second set of hinge eyes of the adjacent row. The second hinge pin member is disposed in the second end of the openings in the first set of hinge eyes of the row and in the first end of the openings in the interleaved second set of hinge eyes of the adjacent row. In this way, the first hinge pin member is restrained in the narrow first end of the opening from rotational motion with respect to the first set of hinge eyes of the row, but is free to roll or rotate relative to the second hinge pin member and to the second set of hinge eyes in the adjacent row. With the elimination of the relative sliding or scrubbing motion between pin and hinge eye and the introduction of rolling motion between the first and second hinge pin members, wear life is increased, especially in abrasive conditions.

In preferred versions of the conveyor belt, the hinge pin members are of identical cross-section. This reduces the number of unique parts and makes for easier assembly and repair, when needed. In one version, the hinge pin is divided into identical hinge pin members, such as flat strips. In another version of the invention, the hinge pins are formed as a single piece with a frangible region between the first and second hinge pin members to allow the unitized hinge pin to be inserted easily into the hinge eye openings, Subsequent flexing of the belt at the hinge breaks the frangible region and separates the unitized hinge pin into the first and second hinge pin members.

Confronting faces on the first and second hinge pin members that bear against each other may be parabolic, hyperbolic, ellipsoidal, circular arcs, V-shaped, or a combination of flat and curved surfaces, for example. To prevent the confronting faces of the hinge pin members from wearing quickly, the hinge pins can be made of durable materials, such as polyurethanes, polyamides, polyvinylchlorides, fluorocarbons, and stainless steel.

In another version, the hinge pin is manufactured with a flexible bridge connected between the first and second hinge pin members to form a living hinge in the pin between the two hinge pin members. Such a pin can be made by co-injection molding or co-extrusion, for example.

In another version, the openings are formed with a slotted portion at the narrow first end to restrain the hinge pin member confined therein and a sector-shaped portion of the second end to allow the associated hinge pin member freedom to rotate relative to the restrained hinge pin member. The openings may be oriented with an axis of symmetry in the direction of belt travel or oblique to the direction of belt travel.

Thus, a conveyor belt embodying features of the invention decreases relative rubbing contact between hinge pin and belt module, thereby making such a conveyor belt particularly long-lasting in abrasive environments.

DRAWINGS

These and other features, aspects, and advantages of the invention are described in more detail in the following description, appended claims, and accompanying drawings in which:

FIGS. 4A–4C are isometric and elevation views of yet another version of hinge pin having a frangible region usable in the conveyor belt of FIG. 1;

FIGS. 5A–5C are isometric and end elevation views of yet another version of hinge pin having a flexible connection between two hinge pin members usable in the conveyor belt of FIG. 1;

DETAILED DESCRIPTION

Figure 1:
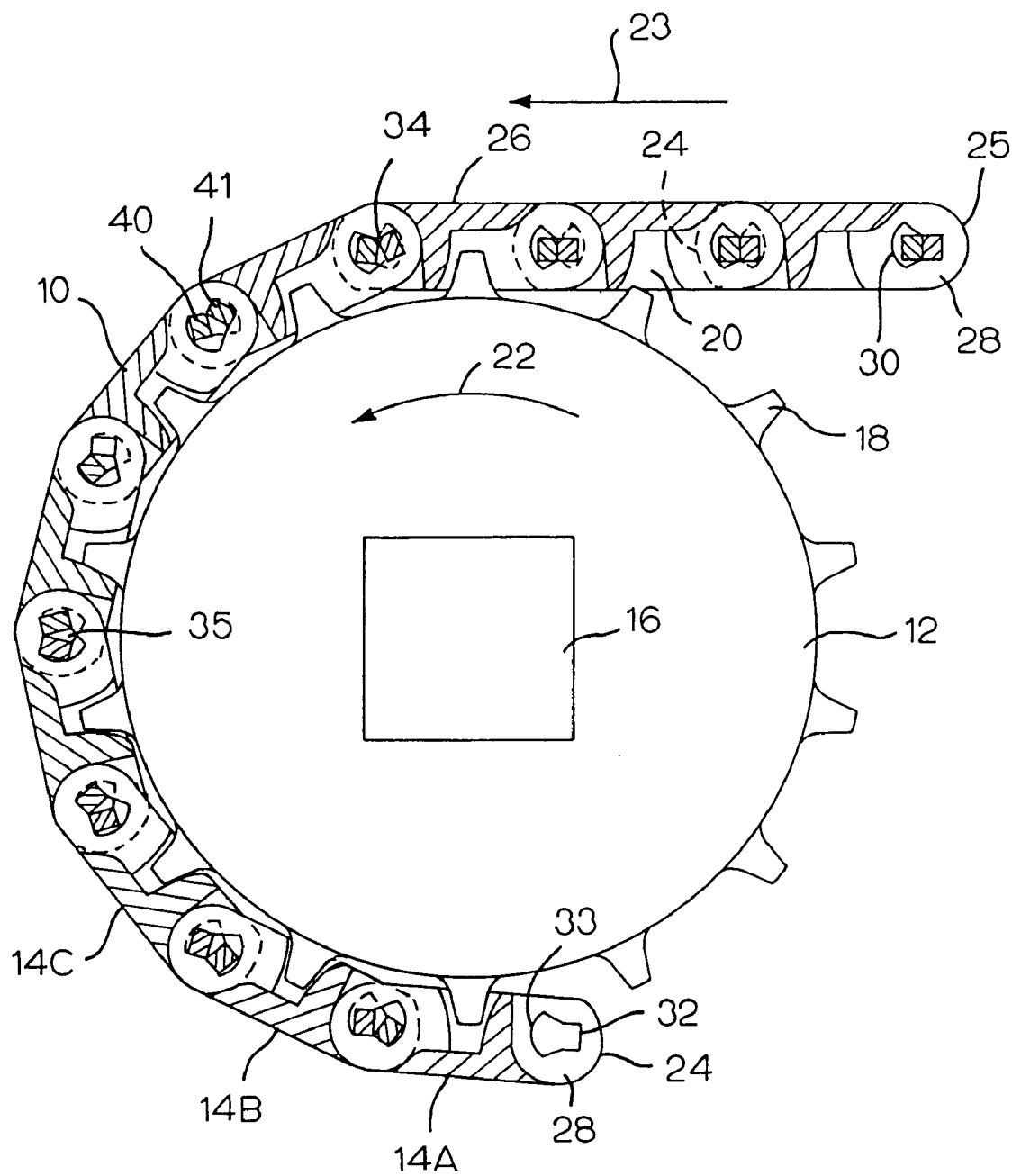
FIG. 1 is a partial side cross-sectional elevation view of a conveyor belt embodying features of the invention.

A portion of a conveyor belt 10 having features of the invention is shown in FIG. 1 engaged with and articulating about a sprocket 12. The belt is made up of a series of rows, such as the three consecutive rows 14A–C. Each row may consist of a single belt module defining the width of the belt or multiple modules arranged side by side, typically in a brick-lay pattern from row to row, across the width of the belt. Typical modular plastic conveyor belts are manufactured and sold, for example, by Intralox, Inc. of Harahan, La., USA. The belt modules are conventionally made by injection-molding thermoplastic materials such as polypropylene, polyethylene, acetal, nylon, or composite polymers, to name a few. The sprocket has a central bore 16 for a shaft (not shown), which may be driven by a drive motor (not shown). Teeth 18 on the periphery of the sprocket engage drive surfaces in the belt, such as the walls of drive pockets 20 formed in the underside of the belt. As the sprocket rotates in the direction of curved arrow 22, the belt is driven in a direction of travel indicated by arrow 23. The modules on each row extend in the direction of belt travel from a forward end 24 to a rearward end 25. The outer sides of the belt modules form a conveying surface 26 on which articles are conveyed. One or more hinge eyes 28 are arranged along the forward and rearward ends of each row. An opening 30 is formed in the hinge eyes. The opening extends from a first end 32 to a second end 33. The opening is narrower at the first end than at the second end. The rows are arranged end-to-end with a first set of hinge eyes along the forward end of a trailing row interleaved with a second set of hinge eyes along the rearward end of an adjacent leading row. In this arrangement, the openings in the hinge eyes form a continuous passageway between each belt row. A hinge pin 34 extends through the passageway to form with the interleaved hinge pins a hinge 35 between adjacent rows at which the belt can articulate.

Figure 2:
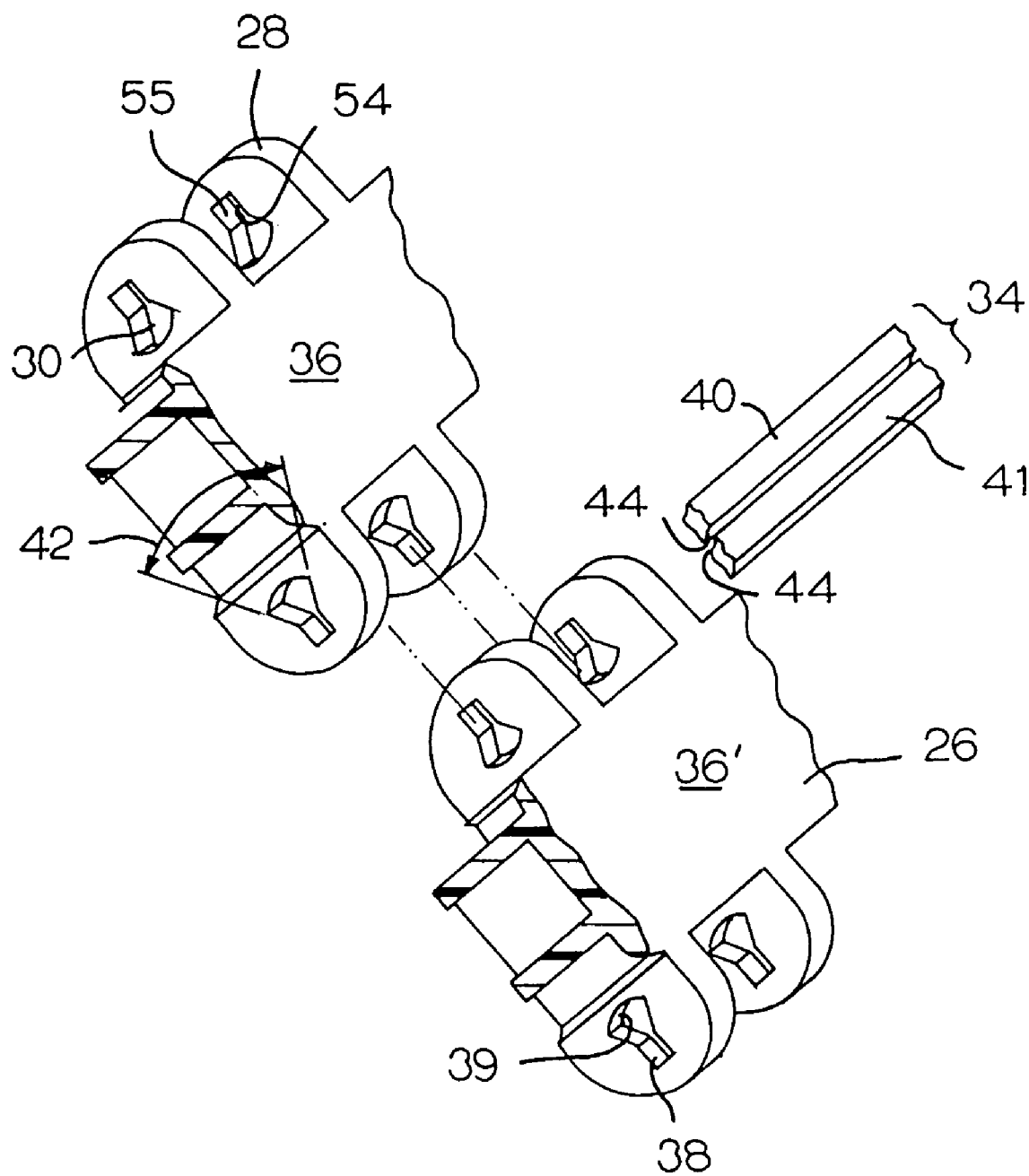
FIG. 2 is a partial exploded cross-sectional isometric view of the hinge region between two adjacent rows of the conveyor belt of FIG. 1.

The formation of the hinge is shown in FIG. 2 as well. Belt modules 36, 36' from adjacent rows are shown separated for clarity. Each opening 30 has a slotted portion 38 at the narrow first end and a sector-shaped portion 39 at the second end. The openings are shown in this example with an axis of symmetry in the direction of belt travel to allow for equal articulation and backflexing ranges. The two-part hinge pin 34 is divided lengthwise into a pair of hinge pin members 40, 41, shown in the examples of FIGS. 1 and 2 as separated strips of identical cross-section. The first hinge pin member 40 is nested in the narrow slotted portion 38 of the openings in the first set of hinge eyes of the module 36'. The second hinge pin member 41 resides in the sector-shaped portion 39 of those openings in the module 36'. Rather than being circular in cross section and susceptible to rolling, the hinge pin members preferably have distinct sides, such as four sides as generally shown in FIGS. 1 and 2. Thus, upper and lower walls 54, 55 of the slotted portion of the opening form restraining surfaces that restrain the first hinge pin member in the narrow, restricted region of the opening and prevent the first hinge pin member from rotating relative to the module 36'. The spacing between the upper and lower walls is slightly greater than the thickness of the confined hinge pin member. The sector-shaped portion, on the other hand, forms an open region that allows the second hinge pin member 41 to rotate through a range of articulation angles 42 defined by the arc length of the sector. Conversely, the openings in the hinge eyes of the module 36 on the adjacent row restrain the second hinge pin member and provide freedom of articulation to the first hinge pin member. In this way, there is no relative rubbing motion between the hinge pin and the hinge eye. The only relative motion is between the confronting faces 44 of the side-by-side hinge pin members. The hinge pins are preferably made of a thermoplastic material formed by molding or extrusion. The wear life of the hinge pin can be extended by manufacturing the hinge pin out of a strong, durable material, such as polyurethanes, polyamides, polyvinylchlorides, fluorocarbons, and stainless steel. As used herein, a durable material is any material characterized by an abrasion-resistance superior to the abrasion-resistance of polymers such as polyethylene and polypropylene. Thus, because relative motion between hinge pin and belt module is diminished, belt modules can be made of standard materials, such as polypropylenes, polyethylenes, acetal, nylon, or composites and still have a long life even in abrasive environments.

Figure 3A:
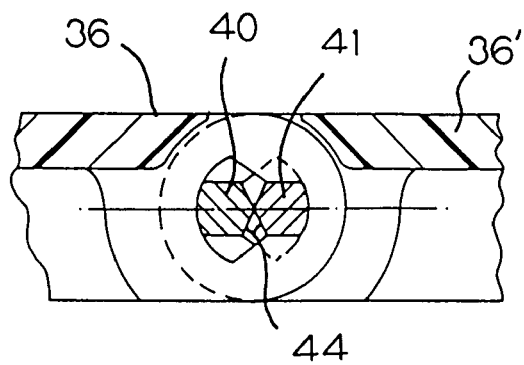
FIGS. 3A–3C are partial side elevation views of the hinge of a conveyor belt as in FIG. 1, but with different versions of hinge pins.
Figure 3B:
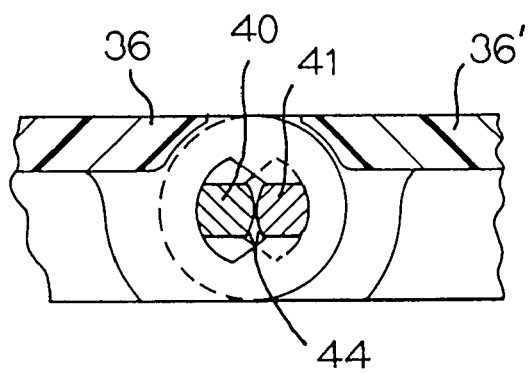
Figure 3C:
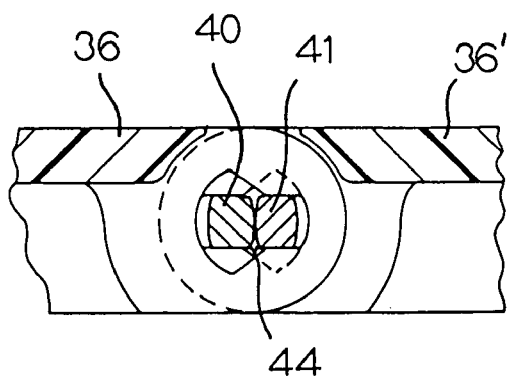

Various versions of hinge pins are illustrated in the examples of FIGS. 3A–C. In FIG. 3A, the confronting rocker faces of the hinge pin members 40, 41 are V-shaped with two flat surfaces. In FIG. 3B, the faces are portions of a circular arc. In FIG. 3C, the curved faces represent that parabolic, hyperbolic, or ellipsoidal surfaces are possible. These and other shapes, or combinations of these flat and curved shapes, can be used effectively. The confronting faces contact each other and bear the pull, or tension, of the belt. As the belt articulates about a sprocket and consecutive rows rotate relative to each other, the confronting faces of the hinge pin members rock against each other. The rocking motion results in less wear than the rubbing motion between hinge pin and hinge eye in typical belts.

Another version of hinge pin 34' is shown in FIGS. 4A–4C. This hinge pin is formed as a single piece made up of first hinge pin member 40 and second hinge pin member 41 connected by a frangible region 46, such as a thinned-out webbing or a perforated region. This hinge pin is easier to insert into the hinge eye openings during belt construction than two separated hinge pin members. Articulation of the belt causes the frangible region to break, separating the two hinge to pin members for normal belt operation.

Yet another version of hinge pin 34" is shown in FIGS. 5A–C. Unlike in previously described versions, the two hinge pin members 40, 41 are not separated into unconnected pieces. Instead, they are connected by a bridge 48 made of a flexible material, such as an elastomer (e.g., polyurethanes, polyesters, and polyethers). The flexible bridge forms a living hinge between the two hinge pin elements that permits the hinge to function as it does with separated hinge pin members. This two-material hinge pin can be made using a co-molded or a co-extruded process. By filling the gap between the two hinge pin members, the flexible bridge keeps abrasives out.

Figure 6A:
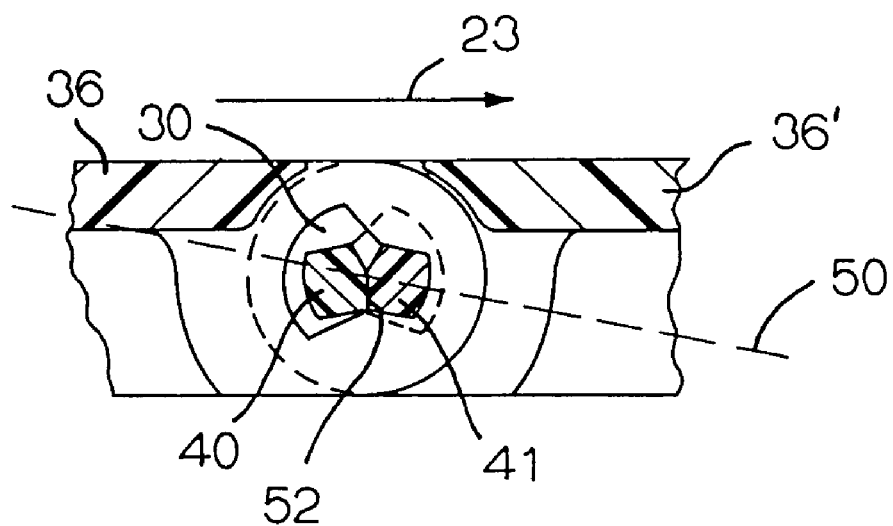
FIG. 6A is a partial side elevation view of the hinge of a conveyor belt as in FIG. 1, but with a differently oriented hinge eye opening.
Figure 6B:
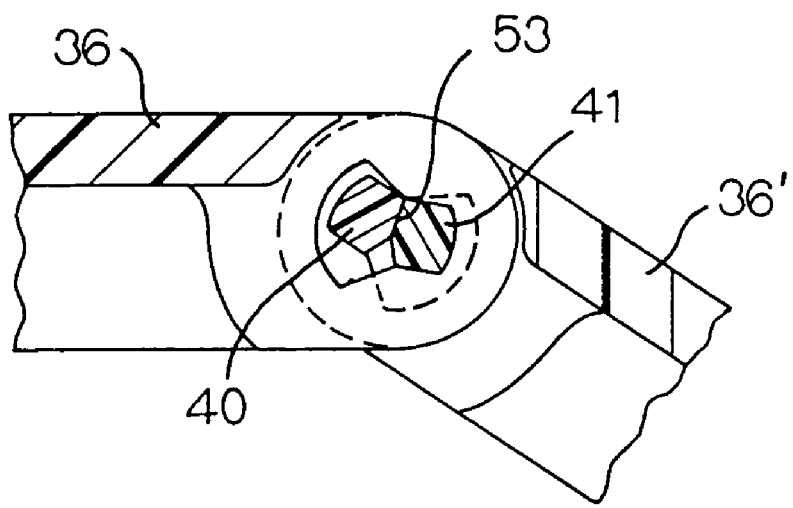
FIG. 6B is a view as in FIG. 6A, showing the belt articulating at the hinge.

In the versions shown in FIGS. 6A–B, the axis of symmetry 50 of each hinge-eye opening 30 is oblique to the direction of belt travel 23. In this way, the two hinge pin members, for example, V-shaped members 40, 41 in FIGS. 6A–B, can be made to contact each other along lower contact regions 52 of their confronting faces on straight runs (FIG. 6A) and along upper contact regions 53 when the belt is articulating about a sprocket (FIG. 6B) rather than on the vertex of the V. The increased contact area reduces the pressure between the hinge pin members and the associated wear.

Figure 7:
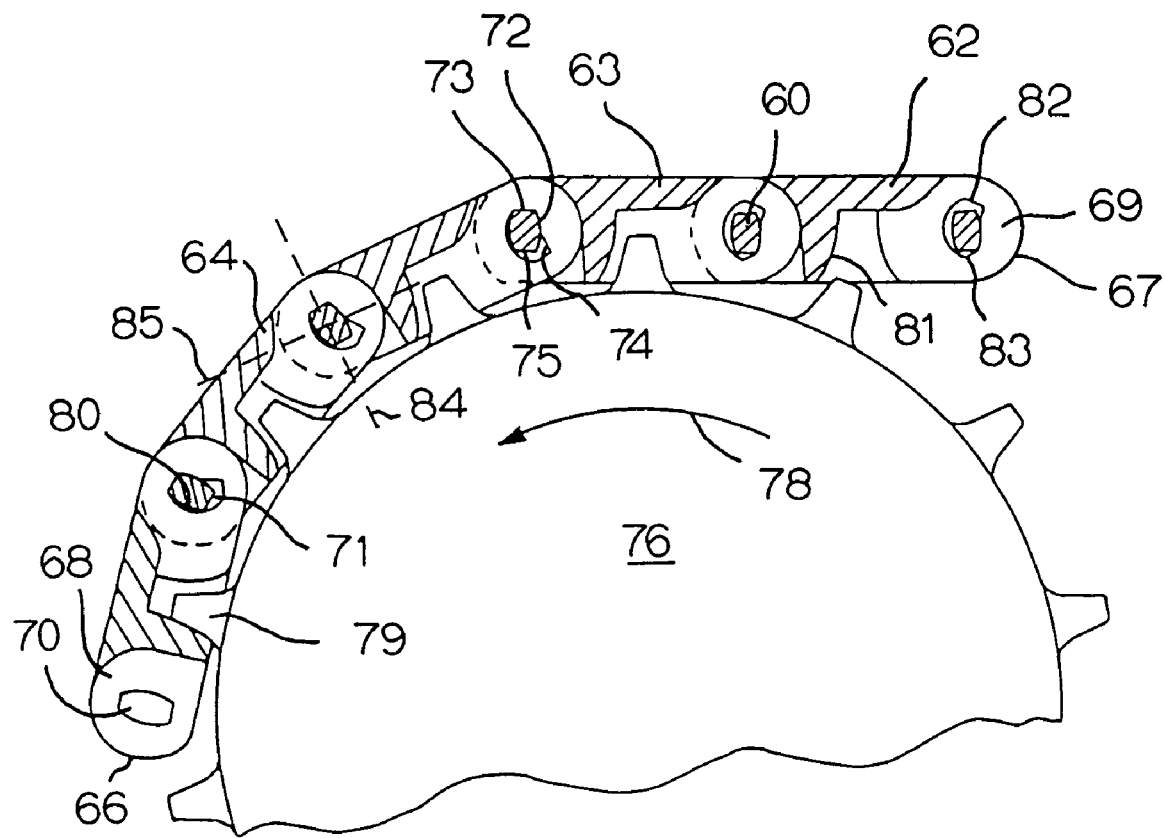
FIG. 7 is a partial side elevation view of another version of conveyor belt embodying features of the invention including a single non-circular hinge pin at each hinge joint.

In another version of conveyor, shown in FIG. 7, a single non-circular hinge pin 60 is installed between consecutive rows 62, 63 of a belt 64. Each row includes one or more belt modules extending from a forward end 66 to a rearward end 67. A first set of hinge eyes 68 with first aligned openings 70 is arranged along the forward end of each module. A second set of hinge eyes 69 with second aligned openings 71 is arranged along the rearward end. The hinge eyes of consecutive rows are interleaved and connected by the hinge pin to form a hinge between consecutive rows. The hinge pin shown in this example is barrel-shaped in cross section with a flat top 73 and a flat bottom 75. One side, the rearward side, forms a convex rocker face 72. The rearmost surface bounding the second opening 71 forms a confronting convex rocker surface 74 on the module's hinge eye. As the belt articulates about a drive element such as a drive drum or sprocket 76 driving the belt in the direction of arrow 78 by means of teeth 79 pushing on drive surfaces 81, the rocker face of the hinge pin rocks, rather than slides, against the rocker surface of the second hinge eye openings. This rocking contact is less abrasive than sliding contact. The first openings 70 are preferably shaped similar to the cross section of the hinge rod, but dimensioned slightly greater to admit the hinge pin without too much play. The second openings have an arcuate forward surface 80 to provide clearance for the hinge pin as it pivots relative to the second openings during belt articulation. The second openings are thus preferably formed as curved slots. The slots are offset relative to the first openings with a first gap 82 extending farther above the hinge pin than a second gap 83 extending below when the belt is traveling on a straight path. This allows the belt to bend forward as it goes around a sprocket at a greater angle than it can backflex as it enters an incline or as it goes over shoes on a returnway. Of course, the slot forming the second opening could just as well not be offset to provide for equal extents of forward and backward bending. The hinge pin members of FIGS. 3A–C are other examples of convex rocker faces that could be used in the hinge pin of FIG. 7. Likewise, the convex rocker surfaces bounding the second openings in the belt modules could have those same contours. As shown, the hinge pins are symmetrical about orthogonal axes 84, 85 for easy insertion into the hinge of a belt.

Although the invention has been described in detail with respect to a few preferred versions, other versions are possible. For example, the openings need not be symmetrical; the sector-shaped portion could allow for more rotation in one direction than in the other. The shape of the openings could be other than as shown in the drawings. A rounded triangular shape, for instance, that restrains one of the hinge pin members at one vertex and allows the other hinge pin free to rotate along its opposite base would function according to the invention. Therefore, as these few examples suggest, the scope of the claims should not be limited to the description of the preferred versions.

What is claimed is:

1. A modular plastic conveyor belt suitable for abrasive environments, the conveyor belt comprising:
   a series of rows of belt modules wherein each row includes at least one belt module extending from a forward end to a rearward end in the direction of belt travel and including a first set of hinge eyes along the forward end and a second set of hinge eyes along the rearward end, wherein the first set of hinge eyes form first aligned openings therethrough and wherein the second set of hinge eyes form second aligned openings therethrough, the rows being arranged end to end with the first set of hinge eyes of a row interleaved with the second set of hinge eyes of an adjacent row; and
   a plurality of non-circular hinge pins including a convex rocker face along one side and received in the first and second openings in the interleaved hinge eyes at the ends of each row to connect consecutive rows into a conveyor belt having a hinge between consecutive rows,
   wherein each of the second openings is bounded by a convex rocker surface against which the convex rocker face of the received hinge pin rocks as the belt articulates about the hinge pin at the hinge.

2. A modular plastic conveyor belt as in claim 1 wherein the first openings are characterized by a shape generally the same as the cross-section of a hinge pin.

3. A modular conveyor belt as in claim 1 wherein the first openings are characterized by a barrel shape.

4. A modular conveyor belt as in claim 1 wherein the cross section of the rod is symmetrical about orthogonal axes.

5. A modular conveyor belt as in claim 1 wherein the rocker faces are circular arcs.

6. A modular conveyor belt as in claim 1 wherein the rocker faces are V-shaped.

7. A modular conveyor belt as in claim 1 wherein the rocker faces are a combination of flat surfaces and curved surfaces.

8. A modular conveyor belt as in claim 1 wherein the convex rocker surfaces of the second openings form the rearmost surfaces of the second openings.

9. A modular plastic conveyor belt suitable for abrasive environments, the conveyor belt comprising:
   a series of rows of belt modules wherein each row includes at least one belt module extending from a forward end to a rearward end in the direction of belt travel and including a first set of hinge eyes along the forward end and a second set of hinge eyes along the rearward end, wherein the hinge eyes form aligned openings therethrough extending from a first end to a second end and wherein the openings are narrower at the first end than at the second end, the rows being arranged end to end with the first set of hinge eyes of a row interleaved with the second set of hinge eyes of an adjacent row; and a plurality of non-circular first hinge pins and a plurality of non-circular second hinge pins, having rocker faces and being arranged side by side in the openings in the interleaved hinge eyes at the ends of each row to connect consecutive rows into a conveyor belt having a hinge between consecutive rows.

10. A modular plastic conveyor belt as in claim 9 wherein the first hinge pins and the second hinge pins are identical.

11. A modular conveyor belt as in claim 9 wherein the rocker faces of the first and second hinge pins are confronting faces that bear against each other as the belt travels.

12. A modular conveyor belt as in claim 11 wherein the confronting faces have curved surface shapes selected from the group consisting of parabolic, hyperbolic, and ellipsoidal shapes.

13. A modular conveyor belt as in claim 11 wherein the confronting faces are circular arcs.

14. A modular conveyor belt as in claim 11 wherein the confronting faces are V-shaped.

15. A modular conveyor belt as in claim 11 wherein the confronting faces are a combination of flat surfaces and curved surfaces.

16. A modular conveyor belt as in claim 9 wherein the first and the second hinge pins are flat strips.

17. A modular conveyor belt as in claim 9 wherein the hinge pins are made of a material selected from the group consisting of polyurethanes, polyamides, polyvinylchlorides, fluorocarbons, and stainless steel.

18. A modular conveyor belt as in claim 9 wherein a first hinge pin and a second hinge pin are manufactured unitarily with a frangible region between the first hinge pin and the second hinge pin that can be broken to separate the first hinge pin from the second hinge pin.

19. A modular conveyor belt as in claim 9 further including a flexible bridge connected between the first hinge pin and the second hinge pin.

20. A modular conveyor belt as in claim 9 wherein the openings are characterized by a slotted portion at the narrow first end and a sector-shaped portion at the second end.

21. A modular conveyor belt as in claim 20 wherein the first hinge pin resides in the slotted portion of the openings in the hinge eyes along the forward end of a row and the second hinge pin resides in the sector-shaped portion of the openings in the hinge eyes along the forward end of the row.

22. A modular conveyor belt as in claim 20 wherein the openings have an axis of symmetry oblique to the direction of belt travel.

* * * * *